(12) United States Patent
Cai et al.

(10) Patent No.: US 11,605,215 B2
(45) Date of Patent: Mar. 14, 2023

(54) OBJECT ASSOCIATION METHOD, APPARATUS AND SYSTEM, AND STORAGE MEDIUM

(71) Applicant: SENSETIME INTERNATIONAL PTE. LTD., Singapore (SG)

(72) Inventors: Zhongang Cai, Singapore (SG); Junzhe Zhang, Singapore (SG); Daxuan Ren, Singapore (SG); Cunjun Yu, Singapore (SG); Haiyu Zhao, Singapore (SG); Shuai Yi, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 60 days.

(21) Appl. No.: 17/128,673

(22) Filed: Dec. 21, 2020

(65) Prior Publication Data

US 2022/0036117 A1 Feb. 3, 2022

Related U.S. Application Data

(63) Continuation of application No. PCT/IB2020/060208, filed on Oct. 30, 2020.

(30) Foreign Application Priority Data

Aug. 1, 2020 (SG) .............. 10202007356U

(51) Int. Cl.
*G06V 10/44* (2022.01)
*G06K 9/62* (2022.01)
(Continued)

(52) U.S. Cl.
CPC ......... *G06V 10/457* (2022.01); *G06K 9/6215* (2013.01); *G06K 9/6232* (2013.01);
(Continued)

(58) Field of Classification Search
CPC .. G06K 9/6215; G06K 9/6232; G06V 10/443; G06V 10/457; G06T 7/74; G06T 7/80; G06T 7/33
See application file for complete search history.

(56) References Cited

U.S. PATENT DOCUMENTS 10,825,150 B2 11/2020 Zeng
2016/0042251 A1 2/2016 Cordova-Diba et al.
(Continued)

FOREIGN PATENT DOCUMENTS

CN 107680128 A 2/2018
CN 108230353 A 6/2018
(Continued)

OTHER PUBLICATIONS

Zheng, Wei-Shi, Shaogang Gong, and Tao Xiang. "Group association: Assisting re-identification by visual context." Person Re-Identification. Springer, London, 2014. 183-201. (Year: 2014).*
(Continued)

*Primary Examiner* — Vu Le
*Assistant Examiner* — Tracy Mangialaschi
(74) *Attorney, Agent, or Firm* — Cooper Legal Group, LLC

(57) ABSTRACT

An object association method, apparatus and system, and a storage medium are provided. The method includes: obtaining a first image and a second image; and determining an association relationship between objects in the first image and objects in the second image based on surrounding information of the objects in the first image and surrounding information of the objects in the second image, where the surrounding information of one object is determined according to pixels within a set range around a bounding box of the object in the image where the object is located.

15 Claims, 4 Drawing Sheets

(51) Int. Cl.
  *G06T 7/73* (2017.01)
  *G06T 7/80* (2017.01)
(52) U.S. Cl.
  CPC .............. *G06T 7/74* (2017.01); *G06T 7/80* (2017.01); *G06V 10/443* (2022.01)

(56) References Cited

U.S. PATENT DOCUMENTS

2019/0130538 A1  5/2019  Zeng
2020/0026949 A1  1/2020  Alcock et al.

FOREIGN PATENT DOCUMENTS

| CN | 111008631 A | 4/2020 |
| CN | 111369590 A | 7/2020 |
| JP | 2014036414 A | 2/2014 |
| JP | 2014089626 A | 5/2014 |
| JP | 2014149620 A | 8/2014 |
| JP | 2016157166 A | 9/2016 |
| JP | 2016157336 A | 9/2016 |
| JP | 2019008480 A | 1/2019 |
| JP | 2019016098 A | 1/2019 |
| JP | 2019174868 A | 10/2019 |
| KR | 20080101998 A | 11/2008 |
| KR | 20160045098 A | 4/2016 |
| KR | 20160088226 A | 7/2016 |

OTHER PUBLICATIONS

Chen, Yiqiang, et al. "Person Re-identification using group context." International Conference on Advanced Concepts for Intelligent Vision Systems. Springer, Cham, 2018. (Year: 2018).*
Xu, Yuanlu, et al. "Cross-view people tracking by scene-centered spatio-temporal parsing." Proceedings of the AAAI Conference on Artificial Intelligence. vol. 31. No. 1. 2017. (Year: 2017).*
Phillips S, Daniilidis K. All graphs lead to rome: Learning geometric and cycle-consistent representations with graph convolutional networks. arXiv preprint arXiv:1901.02078. Jan. 7, 2019. (Year: 2019).*
Nithin, Kanishka, and François Bremond. "Multi-camera tracklet association and fusion using ensemble of visual and geometric cues." IEEE Transactions on Circuits and Systems for Video Technology 27.3 (2017): 431-440. (Year: 2017).*
Cai Z, Zhang J, Ren D, Yu C, Zhao H, Yi S, Yeo CK, Loy CC. MessyTable: Instance Association in Multiple Camera Views. arXiv preprint arXiv:2007.14878. Jul. 29, 2020. (Year: 2020).*
International Search Report in the international application No. PCT/IB2020/060208, dated Jan. 28, 2021, 4 pgs.
Written Opinion of the International Search Authority in the international application No. PCT/IB2020/060208, dated Jan. 28, 2021, 5 pgs.
"Robust Visual Tracking with Double Bounding Box Model", 2014, Junseok Kwon, Junha Roh, Kyoung Mu Lee and Luc Van Gool, European Conference on Computer Vision, pp. 377-392.
First Office Action of the Australian application No. 2020294259, dated Oct. 29, 2021, 6 pgs.
First Office Action of the Korean application No. 10-2020-7037357, dated Feb. 21, 2022, 11 pgs.
"MessyTable: Instance Association in Multiple Camera Views" Jul. 2020, Zhongang Cai, Junzhe Zhang, Daxuan Ren, Cunjun Yu, Haiyu Zhao, Shuai Yi, Chai Kiat Yeo and Chen Bhange Loy, Computer Science, Computer Vision and Parttern Recognition, reprinied from the internet at: https://arxiv.org/pdf/2007.14878.pdf, 27 pgs.
"DALES: Automated Tool for Detection, Annotation, Labelling and Segmentation of Multiple Objects in Multi-Camera Video Streams", Aug. 2019, M. Bhat and J.I. Olszewska, Proceedings of the 25th International Conference on Computational Linguistics, pp. 87-94.
"Multiple Cues Association for Multiple Object Tracking based on Convolutional Neural Network", Jun. 2019, Ronghua Hu, Samir Bouindour, Hichem Snoussi, Abel Cherouat and Charbel Chahla, 2019 IEEE Second International Conference on Artificial Intelligence and Knowledge Engineering, pp. 117-122.
"CNN based Multi-View Object Detection and Association" Oct. 2019, Michael Weber, Lucas Volkert, Christian Hubschneider and J. Marius Zollner, IEEE International Conference on Intelligent Transportation Systems, pp. 73-78.
First Office Action of the Singaporean application No. 10202007356U, dated Jan. 28, 2021, 10 pgs.
Notice of Allowance of the Korean application No. 10-2020-7037357, dated Aug. 18, 2022, 4 pgs.
First Office Action of the Japanese application No. 2020-572930, dated Nov. 8, 2022, 8 pgs.

* cited by examiner

OBJECT ASSOCIATION METHOD, APPARATUS AND SYSTEM, AND STORAGE MEDIUM

CROSS-REFERENCE TO RELATED APPLICATIONS

The present application is a continuation of International Patent Application No. PCT/IB2020/060208, filed on Oct. 30, 2020, which claims priority to Singapore Patent Application No. 10202007356U, filed on Aug. 1, 2020. The disclosures of International Patent Application No. PCT/IB2020/060208 and Singapore Patent Application No. 10202007356U are hereby incorporated by reference in their entireties.

BACKGROUND

A multi-camera system is very common in real life. Compared with a single-camera system, the multi-camera system has a wider field of view. For example, an unmanned aerial vehicle is generally equipped with a multi-camera system, so as to acquire images at different angles by means of the multi-camera system, and thus the shielding problem that cannot be solved by a single camera can be solved. Complete information of a photographed object can be obtained by fusing information of cameras in the multi-camera system.

At present, multi-camera fusion can be performed by means of a conventional feature comparison method or a deep learning feature comparison method. However, no matter which feature comparison method is used, objects having similar or same appearance cannot be distinguished. For a scene where a large number of same or similar objects are included, the use of a feature comparison method greatly reduces the fusion precision of information of the cameras in the multi-camera system.

SUMMARY

The present disclosure relates to, but is not limited to, image processing technologies. Embodiments of the present disclosure provide an object association method, apparatus and system, an electronic device, a storage medium and a computer program.

The technical solutions of the embodiments of the present disclosure are implemented as follows:

An object association method provided by the embodiments of the present disclosure includes: obtaining a first image and a second image; and determining an association relationship between a plurality of objects in the first image and a plurality of objects in the second image based on surrounding information of the plurality of objects in the first image and surrounding information of the plurality of objects in the second image, where surrounding information of one object is determined according to pixels within a set range around a bounding box of the object in an image where the object is located.

The embodiments of the present disclosure also provide an object association apparatus. The apparatus includes: a processor, and a memory for storing instructions executable by the processor, where the processor is configured to: obtain a first image and a second image; and determine an association relationship between a plurality of objects in the first image and a plurality of objects in the second image based on surrounding information of the plurality of objects in the first image and surrounding information of the plurality of objects in the second image, where surrounding information of one object is determined according to pixels within a set range around a bounding box of the object in an image where the object is located.

The embodiments of the present disclosure also provide an object association system. The system includes: a first image acquisition device, configured to acquire one scene at a first view to obtain a first image; a second image acquisition device, configured to acquire the scene at a second view to obtain a second image, where the first view is different from the second view; and a processor, configured to implement the steps of the method as described above.

The embodiments of the present disclosure also provide a computer readable storage medium, having a computer program stored thereon, where the program, when being executed by a processor, enables the processor to implement the steps of the method as described above.

In the object association method, apparatus and system, the electronic device, the storage medium and the computer program provided by the embodiments of the present disclosure, the method includes: obtaining a first image and a second image; and determining an association relationship between objects in the first image and objects in the second image based on surrounding information of the objects in the first image and surrounding information of the objects in the second image, where the surrounding information of one object is determined according to pixels within a set range around a bounding box of the object in the image where the object is located. By using the technical solutions of the embodiments of the present disclosure, surrounding information of objects in different images is taken as the basis for association matching between the objects of the different images, so that the association matching between objects having similar or same appearance in two images are achieved, and the precision of association matching is improved.

DETAILED DESCRIPTION

The present disclosure is further described in detail below with reference to the accompanying drawings and the specific embodiments.

Figure 1:
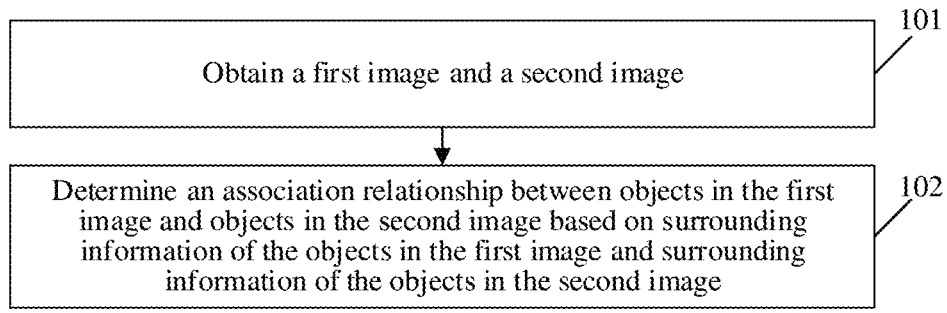
FIG. 1 is a schematic flowchart of an object association method according to embodiments of the present disclosure.

Embodiments of the present disclosure provide an object association method. FIG. 1 is a schematic flowchart of an object association method according to the embodiments of the present disclosure. As shown in FIG. 1, the method includes the following steps.

At step 101, a first image and a second image are obtained.

At step 102, an association relationship between objects in the first image and objects in the second image is determined based on surrounding information of the objects in the first image and surrounding information of the objects in the second image, where the surrounding information of one object is determined according to pixels within a set range around a bounding box of the object in the image where the object is located.

Both the first image and the second image in the embodiments include at least one object. The object may be any object which may appear in a real scene. The type of the object is not limited in the embodiments.

In the embodiments, the first image may be acquired by a first image acquisition device, and the second image may be acquired by a second image acquisition device. In some embodiments, the first image acquisition device and the second image acquisition device may perform, in different views of a same scene, image acquisition on the scene so as to obtain the first image and the second image, respectively. Exemplarily, the first image and the second image may include the same objects; however, the positions of the object in the first image and in the second image may be different. For example, the first image and the second image include the same background and three apples; however, the positions of the three apples in the first image and in the second image are different.

In some other embodiments, the first image and the second image may include the same objects or objects which are different at least in part. The positions of the object in the first image and in the second image are different. For example, the first image and the second image have the same background. However, the first image includes one apple and one pear, while the second image includes one pear and one orange. In this example, the first image and the second image include objects which are different at least in part.

Optionally, the surrounding information of the object includes surrounding pixels of the object in the image or features extracted for the surrounding pixel of the object. For different images acquired in different views for the same scene, the surrounding information of objects having the same or similar appearance in the two images is also slightly different. On this basis, in the case that the objects in the first image and the second image have the same or similar appearance, the association relationship is determined according to the surrounding information of the objects in the two images in the process of determining the association relationship between the objects in the first image and the second image.

The association relationship between two objects respectively located in the two images represents that the two objects are associated with or unassociated with each other. The two objects respectively located in two images being associated with each other represents that the two objects are the same object. The two objects respectively located in the two images being unassociated with each other represents that the two objects are not the same object. Exemplarily, the first image and the second image are images acquired in different views for the same scene; if the scene includes apple 1, apple 2, and apple 3, both the first image and the second image include apple 1, apple 2, and apple 3. Accordingly, apple 1 in the first image is associated with apple 1 in the second image, apple 2 in the first image is associated with apple 2 in the second image, and apple 3 in the first image is associated with apple 3 in the second image. Apple 1 in the first image is unassociated with apple 2 in the second image, apple 1 in the first image is unassociated with apple 3 in the second image, and so on.

In some optional embodiments of the present disclosure, determining the association relationship between the objects in the first image and the objects in the second image based on the surrounding information of the objects in the first image and the surrounding information of the objects in the second image includes: determining the association relationship between the objects in the first image and the objects in the second image based on the surrounding information and appearance information of the objects in the first image, and the surrounding information and appearance information of the objects in the second image, where the appearance information of one object is determined according to pixels within a bounding box of the object in the image where the object is located.

In the embodiments, the appearance information of an object may include pixel information in a region where the object is located. In some embodiments, the region where the object is located may be labeled by means of a bounding box, and pixel information in the bounding box may be taken as the appearance information. In some embodiments, the bounding boxes of the objects in each image may be labeled manually so as to obtain the appearance information of the objects in the first image and the second image. In some other embodiments, the images may be processed by means of a target detection network to obtain the bounding boxes of the objects in the images, and the pixel information in the bounding boxes of the objects in the images is taken as the appearance information of the objects.

In the embodiments, after the bounding boxes of the objects in the first image and the second image are determined, the surrounding information of the objects may be determined based on the bounding boxes of the objects.

In some optional embodiments of the present disclosure, determining the surrounding information of the objects includes: amplifying a region where the bounding box of each object is located, and determining an amplified specific region, where the specific region is greater than the region where the bounding box is located, and includes the region where the bounding box is located; and determining pixel information within the specific region and outside the bounding box as the surrounding information of the object.

In the embodiments, the region where the bounding box of each object is located may be expanded according to a preset ratio. For example, four sides of the region where the bounding box is located are respectively expanded by 20% of the corresponding side length to obtain the specific region, and the pixel information corresponding to the region within the specific region and outside the bounding box is taken as surrounding pixel information of one object.

In the embodiments, feature extraction is performed on the surrounding information and appearance information of an object in the first image, and feature extraction is performed on the surrounding information and appearance information of an object in the second image; matching is performed on a feature of the surrounding information and a feature of the appearance information of one object in the first image and one object in the second image to determine a degree of similarity between one object in the first image and one object in the second image, and the association relationship between the two images is determined based on the degree of similarity.

Figure 2:
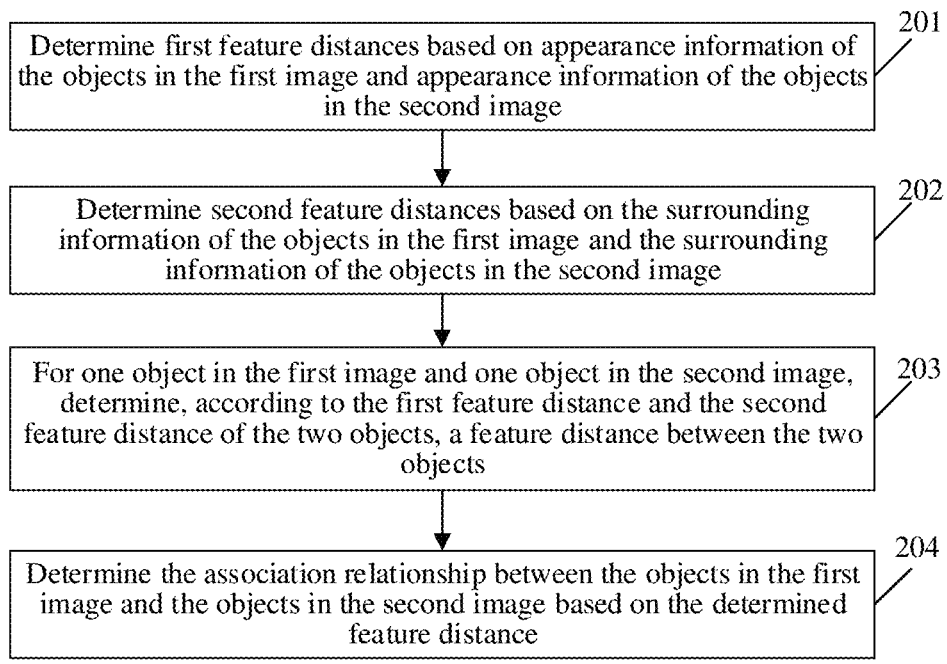
FIG. 2 is another schematic flowchart of an object association method according to embodiments of the present disclosure.

In some optional embodiments of the present disclosure, as shown in FIG. 2, determining the association relationship between the objects in the first image and the objects in the second image based on the surrounding information and appearance information of the objects in the first image, and the surrounding information and appearance information of the objects in the second image includes the following steps.

At step 201, first feature distances are determined based on the appearance information of the objects in the first image and the appearance information of the objects in the second image, where a first feature distance represents a degree of similarity between one object in the first image and one object in the second image.

At step 202, second feature distances are determined based on the surrounding information of the objects in the first image and surrounding information of the objects in the second image, where a second feature distance represents a degree of similarity between the surrounding information of one object in the first image and the surrounding information of one object in the second image.

At step 203, for one object in the first image and one object in the second image, a feature distance between the two objects is determined according to the first feature distance and the second feature distance of the two objects.

At step 204, the association relationship is determined between the objects in the first image and the objects in the second image based on the determined feature distance.

In the embodiments, feature extraction may be respectively performed on the appearance information and surrounding information of the objects in the first image and the second image by means of a feature extraction network. First appearance features of the objects in the first image and second appearance features of the objects in the second image may be respectively obtained by performing feature extraction on the appearance information. First surrounding features corresponding to the objects in the first image and second surrounding features corresponding to the objects in the second image may be respectively obtained by performing feature extraction on the surrounding information. Exemplarily, the feature extraction network includes one or more convolutional layers; convolution processing may be performed on the pixel information within the bounding box of each object in the first image and the second image by means of the convolutional layers to obtain the first appearance feature corresponding to each object in the first image and the second appearance feature corresponding to each object in the second image, and convolution processing may be performed on the pixel information corresponding to the surrounding information of the objects in the first image and the second image to obtain the first surrounding features corresponding to the objects in the first image and the second surrounding features corresponding to the objects in the second image.

In the embodiments, if any object in a first image is labeled as a first object, and any object in a second image is labeled as a second object, the first feature distance may be determined based on the first appearance feature of the first object in the first image and the second appearance feature of the second object in the second image. The first feature distance represents a degree of similarity between the first object and the second object. The larger the first feature distance is, it indicates that the lower the degree of similarity between the first object and the second object is. Accordingly, the smaller the first feature distance is, it indicates that the higher the degree of similarity between the first object and the second object is. In addition, the second feature distance is determined based on a first surrounding feature corresponding to the first object and a second surrounding feature corresponding to the second object. The second feature distance represents a degree of similarity between the surrounding information of the first object and the surrounding information of the second object. The larger the second feature distance is, it indicates that the lower the degree of similarity between the surrounding information of the first object and the surrounding information of the second object is. Accordingly, the smaller the second feature distance is, it indicates that the higher the degree of similarity between the surrounding information of the first object and the surrounding information of the second object is. Furthermore, the feature distance between the first object and the second object may be obtained based on the first feature distance and the second feature distance, and the association relationship between the first object and the second object is determined based on the feature distance.

In some optional embodiments, an L2 distance may be calculated based on the first appearance feature and the second appearance feature, and in this case, the L2 distance is the first feature distance. Accordingly, the L2 distance may be calculated based on the first surrounding feature and the second surrounding feature, and in this case, the L2 distance is the second feature distance.

Exemplarily, the L2 distance satisfies:

$$d_2(I_1, I_2) = \sqrt{\sum_P (I_1^P - I_2^P)^2} \qquad (1)$$

When the L2 distance is the first feature distance, $I_1$ and $I_2$ respectively denote the first appearance feature and the second appearance feature, and P denotes a dimension of the first appearance feature and the second appearance feature; $d_2(I_1,I_2)$ denotes the L2 distance between the first appearance feature and the second appearance feature. Accordingly, when the L2 distance is the second feature distance, $I_1$ and $I_2$ respectively denote the first surrounding feature and the second surrounding feature, and P denotes a dimension of the first surrounding feature and the second surrounding feature; $d_2(I_1,I_2)$ denotes the L2 distance between the first surrounding feature and the second surrounding feature.

In some optional embodiments, determining, according to the first feature distance and the second feature distance of the two objects, the feature distance between the two objects includes: performing weighted summation on the first feature distance and the second feature distance of the two objects to obtain the feature distance between the two objects, where the higher the degree of similarity between the two objects, the greater a weight coefficient of the second feature distance of the two objects during weighted summation.

In the embodiments, weighted summation processing may be performed on the first feature distance and the second feature distance to obtain a feature distance between a first object and a second object. The larger the feature distance is, it indicates that the lower an association between the first object and the second object is. Accordingly, the smaller the feature distance is, it indicates that the higher the association between the first object and the second object is. In some optional embodiments, if the feature distance is greater than a first preset threshold, it can be determined that the first object is unassociated with the second object. If the feature distance is less than a second preset threshold, it can be determined that the first object is associated with the second object, where the second preset threshold is less than the first preset threshold, and values of the first preset threshold and the second preset threshold may be determined according to multiple experiments or tests.

In the embodiments, the higher a degree of similarity between the two objects, the greater a weight coefficient of a second feature distance of the two objects during weighted summation. It can be understood that the two objects are more similar, it is more necessary to make reference to the second feature distance between the surrounding information of the objects in the process of association matching between the objects.

In some optional embodiments, multiple weight coefficients may be pre-configured based on the difference in the degree of similarity between the first appearance feature and the second appearance feature, and one weight coefficient is selected from the multiple configured weight coefficients according to the degree of similarity between the current first appearance feature and second appearance feature as a weight coefficient of the second feature distance of the two objects.

In some other optional embodiments, the feature distance satisfies:

$$d^{ab} = (1-\lambda) \times D_{12}(V_{app}^a, V_{app}^b) + \lambda \times D_{12}(V_{sur}^a, V_{sur}^b) \quad (2)$$

$$\lambda = S_C(V_{app}^a, V_{app}^b) \quad (3)$$

where $d^{ab}$ denotes a feature distance; k is a weight coefficient; $D_{12}(V_{app}^a, V_{app}^b)$ denotes the first feature distance (e.g. an L2 distance) between the first appearance feature $V_{app}^a$ and the second appearance feature $V_{app}^b$; $D_{12}(V_{sur}^a, V_{sur}^b)$ denotes the second feature distance (e.g. an L2 distance) between the first surrounding feature $V_{sur}^a$ and the second surrounding feature $V_{sur}^b$; $S_C$ denotes a cosine similarity, i.e., the weight coefficient $\lambda$ is obtained by calculating the cosine similarity between the first appearance feature $V_{app}^a$ and the second appearance feature $V_{app}^b$.

Figure 3:
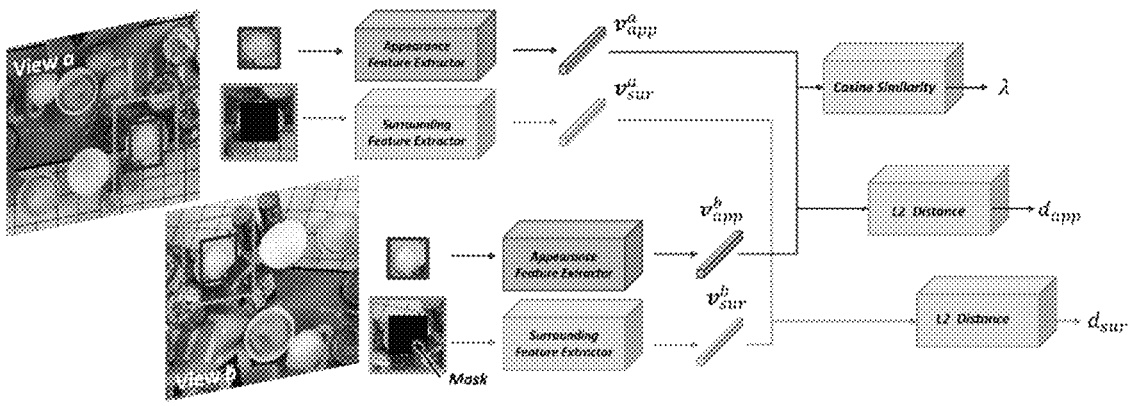
FIG. 3 is a schematic diagram of determining a feature distance in an object association method according to embodiments of the present disclosure.

For example, the above-mentioned process is shown in FIG. 3, where taking two images recorded as View a and View b as example, View a includes a bounding box corresponding to one object (labeled as a first object) and a region (labeled as a first specific region) corresponding to the surrounding information. View b includes a bounding box corresponding to one object (labeled as a second object) and a region (labeled as a second specific region) corresponding to the surrounding information. Pixel information of the bounding box and pixel information of the first specific region of the first object are respectively segmented from View a and View b. In practical applications, for the obtaining of the region corresponding to the surrounding information, an amplified region of the region where each bounding box is located may be segmented from View a or View b, and then the pixel information of the first specific region and the second specific region is obtained by means of a mask having a size consistent with that of the bounding box within a region range corresponding to the bounding boxes in the segmented region.

Furthermore, feature extraction may be performed on the pixel information of the bounding box and the pixel information of specific regions (including the first specific region and the second specific region) by means of two feature extractors, respectively. For example, feature extraction may be performed on the pixel information in the bounding boxes corresponding to View a and View b, and the pixel information of the specific regions (including the first specific region and the second specific region) by means of an appearance feature extractor to obtain the first appearance feature $V_{app}^a$ corresponding to the first object and the second appearance feature $V_{app}^b$ corresponding to the second object. Feature extraction may be performed on the pixel information of the first specific region of View a and the second specific region of View b by means of a surrounding feature extractor to obtain the first surrounding feature $V_{sur}^a$ and the second surrounding feature $V_{cur}^b$. A cosine similarity between the first appearance feature $V_{app}^a$ and the second appearance feature $V_{app}^b$ is then calculated to obtain the weight coefficient $\lambda$. The L2 distance between the first appearance feature $V_{app}^a$ and the second appearance feature $V_{app}^b$ is calculated to obtain the feature distance $d_{app}$ between the first object and the second object. The L2 distance between the first surrounding feature $V_{sur}^a$ and the second surrounding feature $V_{sur}^b$ is calculated to obtain the feature distance $d_{sur}$ between the first surrounding feature and the second surrounding feature. Finally, the feature distance between the first object and the second object is obtained by using the above-mentioned formula (2).

By using the technical solutions of the embodiments of the present disclosure, surrounding information of objects in different images is taken as the basis for association matching between the objects of the different images, so that the association matching between objects having similar or same appearance in two images are achieved, and the precision of association matching is improved.

Figure 4:
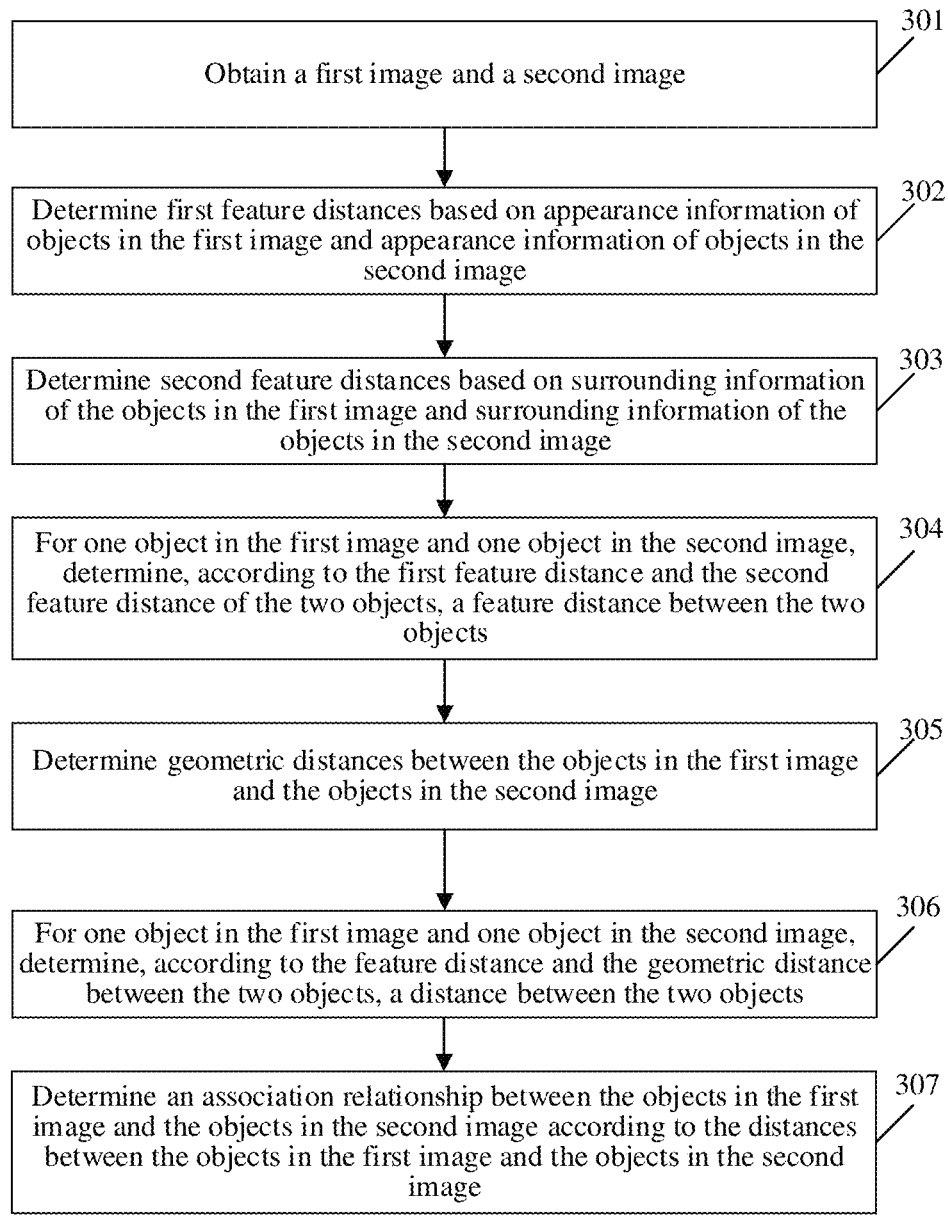
FIG. 4 is yet another schematic flowchart of an object association method according to embodiments of the present disclosure.

The embodiments of the present disclosure also provide an object association method. FIG. 4 is yet another schematic flowchart of an object association method according to the embodiments of the present disclosure. As shown in FIG. 4, the method includes the following steps.

At step 301, a first image and a second image are obtained.

At step 302, a first feature distance is determined based on appearance information of objects in the first image and appearance information of objects in the second image, where a first feature distance represents a degree of similarity between one object in the first image and one object in the second image.

At step 303, second feature distances are determined based on surrounding information of the objects in the first image and surrounding information of the objects in the second image, where one second feature distance represents a degree of similarity between surrounding information of one object in the first image and surrounding information of one object in the second image.

At step 304, for one object in the first image and one object in the second image, a feature distance between the two objects is determined according to the first feature distance and the second feature distance of the two objects.

At step 305, geometric distance between the objects in the first image and the objects in the second image are determined.

At step 306, for one object in the first image and one object in the second image, a distance between the two objects is determined according to the feature distance and the geometric distance between the two objects.

At step 307, an association relationship between the objects in the first image and the objects in the second image is determined according to the distances between the objects in the first image and the objects in the second image.

For descriptions of step 301 to step 304 in the embodiments, reference may be specifically made to the descriptions in the foregoing embodiments. Details are not described herein again.

In some optional embodiments of the present disclosure, determining the geometric distances between the objects in the first image and the objects in the second image includes: obtaining a first position of a first image acquisition device which acquires the first image, and a second position of a second image acquisition device which acquires the second image, and obtaining a first intrinsic parameter of the first image acquisition device and a second intrinsic parameter of the second image acquisition device; determining a third position of a center point of one object in the first image in the first image; determining a polar line in the second image based on the first position, the second position, the third position, the first intrinsic parameter, and the second intrinsic parameter, where the polar line represents a straight line formed by projecting a connection line between a center point of one object in the first image and an image point of the object in an imaging plane of the first image acquisition device to the second image; determining a vertical pixel distance between one object in the second image and the polar line; and determining the geometric distances between the objects in the first image and the objects in the second image according to determined vertical pixel distances.

In order to solve the problems of association matching between objects in a scene where objects having the same or similar appearance and similar surrounding information are included in two images, the epipolar geometry mode is used for constraining in the embodiments so as to achieve the association matching between the objects in the scene, and improve the accuracy of the association matching.

Figure 5:
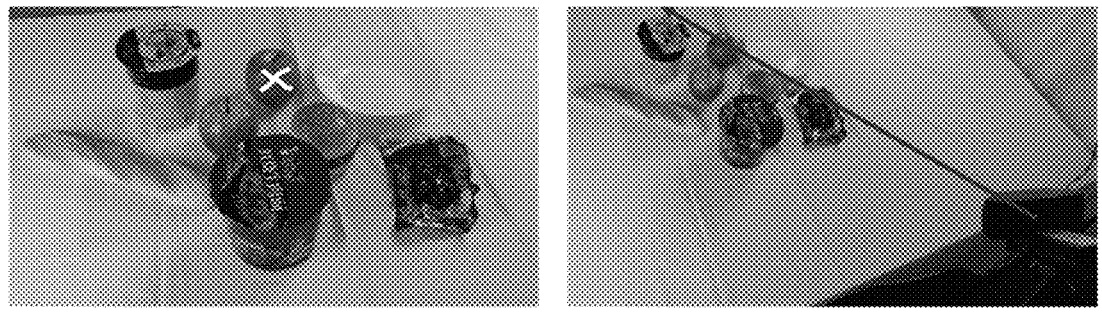
FIG. 5 is a schematic diagram of determining a geometric distance in an object association method according to embodiments of the present disclosure.

In the embodiments, the first image and the second image are images acquired in different views. Assuming that the first image corresponds to a first view, and the second image corresponds to a second view, for a first object in the first image, where the first object is any object in the first image, a center point of the first object is projected to a point P of an imaging plane of a first image acquisition device, and the center point and the point P are connected to form a straight line, which is a straight line in the first view corresponding to the first image. The straight line is projected to the second image to obtain a polar line in the second image in the second view. As shown in FIG. 5, assuming that the first object is an apple labeled by "x" in the left image of FIG. 5, a connection line between a center point of the first object and an image point of the first object in an imaging plane of an image acquisition device which acquires the left image is projected to the right image to obtain a polar line in the right image. The device at the lower right corner of the right image is the image acquisition device which acquires the left image.

In practical applications, a relative position relationship between the first image acquisition device and the second image acquisition device may be determined respectively according to a first position of the first image acquisition device and a second position of the second image acquisition device. A conversion relationship may be determined based on the relative position relationship, a first intrinsic parameter of the first image acquisition device, and a second intrinsic parameter of the second image acquisition device. Coordinates of a connection line between the center point of the first object and the third position in the first image may be determined based on the third position of the center point of the first object in the first image. The coordinates of the connection line between the center point and the third position in the first image are converted based on the conversion relationship to obtain coordinates of a polar line in the second image.

It can be understood that if the first object in the first image is associated with the second object in the second image, that is, the first object and the second object are the same object, after the polar line in the second image is determined, a vertical pixel distance between the second object in the objects of the second image and the polar line is smallest, or even 0. The vertical pixel distance refers to a geometric distance between two objects in the first image and the second image.

Therefore, which object in the second image is associated with the first object in the first image is determined by determining the vertical pixel distances between the objects in the second image and the polar line.

In some optional embodiments of the present disclosure, determining, according to the feature distance and the geometric distance between the two objects, the distance between the two objects includes: performing weighted summation on the feature distance and the geometric distance between the two objects to obtain the distance between the two objects.

In the embodiments, the distance between each pair of first object and second object is obtained by performing weighted summation processing on the feature distance and the geometric distance. A fixed preset value may be used as a weight coefficient used in the weighted summation processing. The value of the weight coefficient is not limited in the embodiments.

In some optional embodiments of the present disclosure, determining the association relationship between the objects in the first image and the objects in the second image according to the distances between the objects in the first image and the objects in the second image includes: forming a distance matrix based on the distances between the objects in the first image and the objects in the second image, where a value of one element in the distance matrix represents a distance between one object in the first image and one object in the second image; and determining an adjacency matrix between the first image and the second image according to the distance matrix, where a value of an element in the adjacency matrix represents that one object in the first image is associated with or unassociated with one object in the second image.

Figure 6:
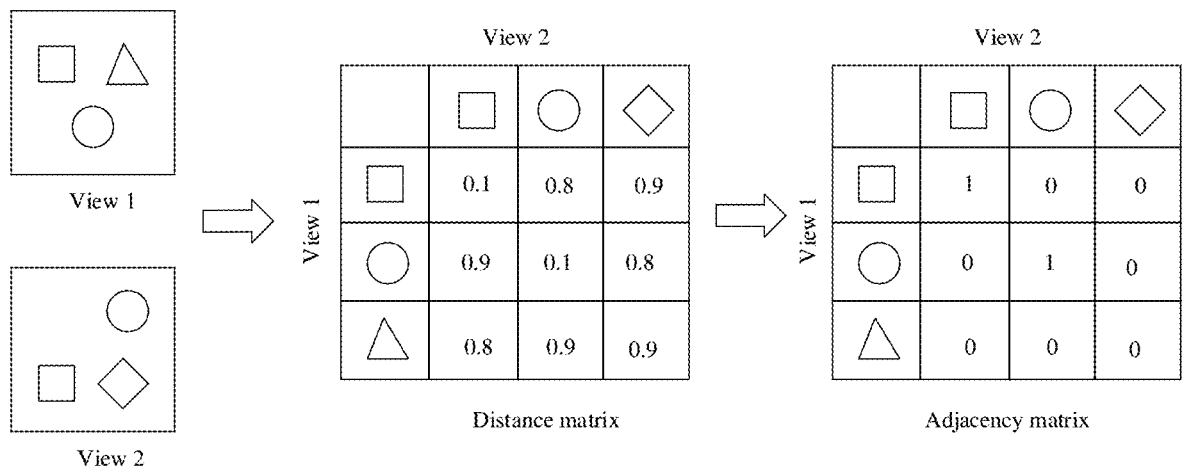
FIG. 6 is a schematic diagram of determining an association relationship in an object association method according to embodiments of the present disclosure.

In the embodiments, one distance is obtained for each pair of first object and second object accordingly. Therefore, there may be M×N distances between M objects in the first image and N objects in the second image. Accordingly, an M×N distance matrix may be formed. As shown in FIG. 6, assuming that View 1 and View 2 include three objects, respectively, a 3×3 distance matrix may be formed. The distance matrix is processed according to a preset algorithm to obtain an adjacency matrix. One pair of objects in the adjacency matrix having a value of 1 are associated with each other, and one pair of objects in the adjacency matrix having a value of 0 are unassociated with each other. Exemplarily, the distance matrix may be processed according to Kuhn-Munkres (KM) algorithm to obtain an adjacency matrix.

Figure 7:
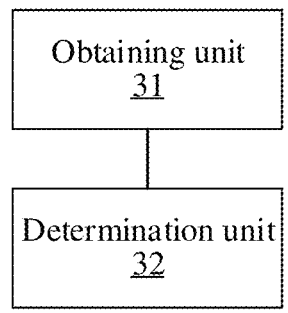
FIG. 7 is a schematic structural diagram of components of an object association apparatus according to embodiments of the present disclosure.

The embodiments of the present disclosure also provide an object association apparatus. FIG. 7 is a schematic structural diagram of components of an object association apparatus according to the embodiments of the present disclosure. As shown in FIG. 7, the apparatus includes: an obtaining unit 31 and a determination unit 32, where the obtaining unit 31 is configured to obtain a first image and a second image; and the determination unit 32 is configured to determine an association relationship between objects in the first image and objects in the second image based on surrounding information of the objects in the first image and surrounding information of the objects in the second image, where the surrounding information of one object is determined according to pixels within a set range around a bounding box of the object in the image where the object is located.

In some optional embodiments of the present disclosure, the determination unit 32 is configured to determine the association relationship between the objects in the first image and the objects in the second image based on the surrounding information and appearance information of the objects in the first image, and the surrounding information and appearance information of the objects in the second image, where the appearance information of one object is determined according to pixels within a bounding box of the object in the image where the object is located.

In some optional embodiments of the present disclosure, the determination unit 32 is configured to determine first feature distances based on the appearance information of the objects in the first image and the appearance information of the objects in the second image, where a first feature distance represents a degree of similarity between one object in the first image and one object in the second image; determine second feature distances based on the surrounding information of the objects in the first image and the surrounding information of the objects in the second image, where a second feature distance represents a degree of similarity between the surrounding information of one object in the first image and the surrounding information of one object in the second image; for one object in the first image and one object in the second image, determine, according to the first feature distance and the second feature distance of the two objects, a feature distance between the two objects; and determine the association relationship between the objects in the first image and the objects in the second image based on the determined feature distance.

In some optional embodiments of the present disclosure, the determination unit 32 is configured to perform weighted summation on the first feature distance and the second feature distance of the two objects to obtain the feature distance between the two objects, where the higher the degree of similarity between the two objects, the greater a weight coefficient of the second feature distance of the two objects during weighted summation.

In some optional embodiments of the present disclosure, the determination unit 32 is further configured to determine geometric distances between the objects in the first image and the objects in the second image, and is further configured to: for one object in the first image and one object in the second image, determine, according to the feature distance and the geometric distance between the two objects, a distance between the two objects; and determine the association relationship between the objects in the first image and the objects in the second image according to the distances between the objects in the first image and the objects in the second image.

In some optional embodiments of the present disclosure, the determination unit 32 is configured to: obtain a first position of a first image acquisition device which acquires the first image, and a second position of a second image acquisition device which acquires the second image, and obtain a first intrinsic parameter of the first image acquisition device and a second intrinsic parameter of the second image acquisition device; determine a third position of a center point of one object in the first image in the first image; determine a polar line in the second image based on the first position, the second position, the third position, the first intrinsic parameter, and the second intrinsic parameter, where the polar line represents a straight line formed by projecting a connection line between a center point of one object in the first image and an image point of the object in an imaging plane of the first image acquisition device to the second image; determine a vertical pixel distance between one object in the second image and the polar line; and determine the geometric distances between the objects in the first image and the objects in the second image according to the determined vertical pixel distance.

In some optional embodiments of the present disclosure, the determination unit 32 is configured to perform weighted summation on the feature distance and the geometric distance between the two objects to obtain the distance between the two objects.

In some optional embodiments of the present disclosure, the determination unit 32 is configured to form a distance matrix based on the distances between the objects in the first image and the objects in the second image, where a value of one element in the distance matrix represents a distance between one object in the first image and one object in the second image; and determine an adjacency matrix between the first image and the second image according to the distance matrix, where a value of an element in the adjacency matrix represents that one object in the first image is associated with or unassociated with one object in the second image.

In the embodiments of the present disclosure, the obtaining unit 31 and the determination unit 32 in the object association apparatus may both be implemented by a Center Processing Unit (CPU), a Digital Signal Processor (DSP), a Microcontroller Unit (MCU), or a Field-Programmable Gate Array (FPGA) in practical applications.

It should be noted that: when performing object association processing, the object association apparatus provided by the aforementioned embodiments are exemplified by division of the above-mentioned procedure modules. In practical applications, the processing allocations above may be achieved by different procedure modules as needed. That is, the internal structure of the apparatus is divided into different procedure modules to achieve all or some of the processing described above. In addition, the object association apparatus provided by the aforementioned embodiments and the object association method embodiment belong to the same concept. Please refer to the method embodiments for the specific implementation process of the object association apparatus. Details are not described herein again.

Figure 8:
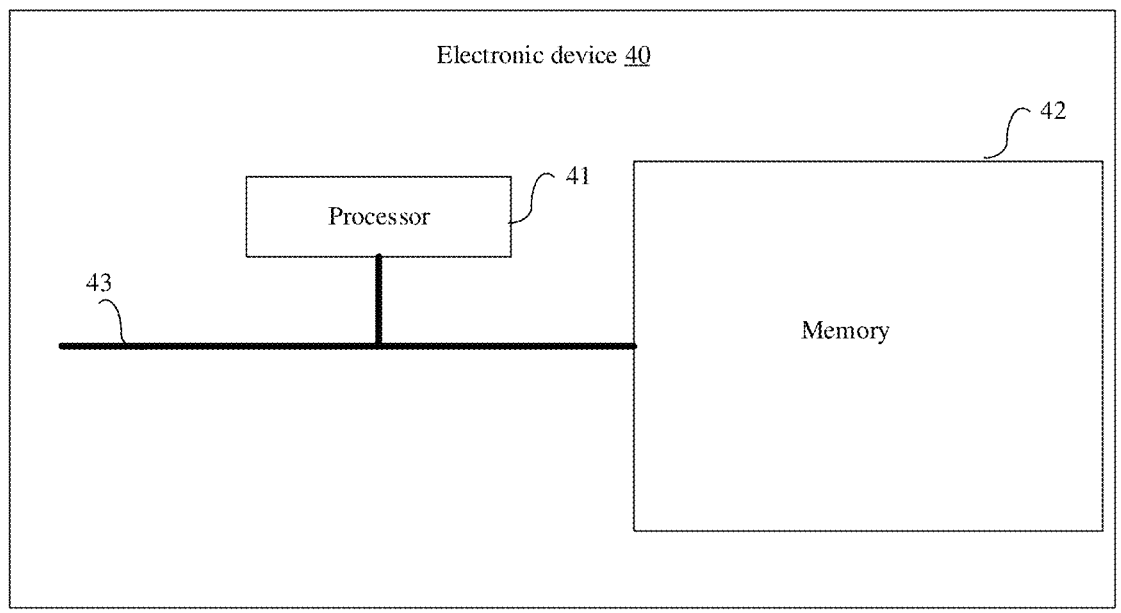
FIG. 8 is a schematic structural diagram of hardware of an electronic device according to embodiments of the present disclosure.

The embodiments of the present disclosure also provide an electronic device. FIG. 8 is a schematic structural diagram of hardware of an electronic device according to the embodiments of the present disclosure. As shown in FIG. 8, the electronic device 40 includes a memory 42, a processor 41, and a computer program stored on the memory 42 and executable on the processor 41, where when the processor 41 executes the program, the steps of the image processing method according to the embodiments of the present disclosure are implemented.

The components in the electronic device 40 are coupled together through a bus system 43. It can be understood that the bus system 43 is configured to implement connection and communication between the components. In addition to a data bus, the bus system 43 further includes a power bus, a control bus, and a status signal bus. However, for clarity, all the buses are labeled as the bus system 43 in FIG. 8.

It can be understood that the memory 42 may be a volatile memory or a non-volatile memory, or may also include both a volatile memory and a non-volatile memory. The non-volatile memory may be a Read-Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, an optical disk, or a Compact Disc Read-Only Memory (CD-ROM). The magnetic surface memory may be a magnetic-disk memory or a magnetic tape memory. The volatile memory may be a Random Access Memory (RAM), which acts as an external cache. By way of exemplary but not restrictive descriptions, many forms of RAMs are available, such as Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDRS-DRAM), Enhanced Synchronous Dynamic Random Access Memory (ESDRAM), SyncLink Dynamic Random Access Memory (SLDRAM), and Direct Rambus Random Access Memory (DRRAM). The memory 42 described in the embodiments of the present disclosure is aimed at including, but not limited to, these and any other suitable type of memory.

The method disclosed by the aforementioned embodiments of the present disclosure can be applied to the processor 41, or is implemented by the processor 41. The processor 41 may be an integrated circuit chip and has a signal processing capability. During implementation, the steps of the foregoing method may be completed by means of an integrated logic circuit of hardware in the processor 41 or instructions in the form of software. The processor 41 may be a general-purpose processor, a DSP, or other programmable logic device, discrete gate or transistor logic device, discrete hardware component or the like. The processor 41 can implement or execute the methods, the steps, and the logical block diagrams disclosed in the embodiments of the present disclosure. The general-purpose processor may be a microprocessor or any conventional processor. The steps of the method disclosed with reference to the embodiments of the present disclosure may be directly implemented by a hardware decoding processor, or implemented by a combination of hardware and software modules in a decoding processor. The software module may be located in a storage medium, and the storage medium is located in the memory 42. The processor 41 reads information in the memory 42 and implements the steps of the foregoing method in combination with the hardware thereof.

In an exemplary embodiment, the electronic device 40 may be implemented by one or more Application Specific Integrated Circuits (ASICs), a DSP, a Programmable Logic Device (PLD), a Complex Programmable Logic Device (CPLD), an FPGA, a general-purpose processor, a controller, an MCU, a microprocessor, or other electronic elements, to perform the foregoing method.

In an exemplary embodiment, the embodiments of the present disclosure further provide a computer readable storage medium, for example, the memory 42 including the computer program. The computer program is executed by the processor 41 in the electronic device 40 to implement the steps of the foregoing method. The computer readable storage medium may be a memory such as FRAM, ROM, PROM, EPROM, EEPROM, a flash memory, a magnetic surface memory, an optical disk, or CD-ROM, and may also be any device including one or any combination of the aforementioned memories, such as a mobile phone, a computer, a tablet device, or a personal digital assistant.

The embodiments of the present disclosure also provide an object association system.
The system includes:
a first image acquisition device, configured to acquire one scene in a first view to obtain a first image;
a second image acquisition device configured to acquire the scene in a second view to obtain a second image, where the first view is different from the second view; and
a processor configured to: obtain the first image and the second image; and determine an association relationship between objects in the first image and objects in the second image based on surrounding information of the objects in the first image and surrounding information of the objects in the second image, where the surrounding information of one object is determined according to pixels within a set range around a bounding box of the object in the image where the object is located.

In some optional embodiments of the present disclosure, the processor is configured to determine an association relationship between the objects in the first image and the objects in the second image based on the surrounding information and appearance information of the objects in the first image, and the surrounding information and appearance information of the objects in the second image, where the appearance information of one object is determined according to pixels within a bounding box of the object in the image where the object is located.

In some optional embodiments of the present disclosure, the processor is configured to determine first feature distances based on the appearance information of the objects in the first image and the appearance information of the objects in the second image, where a first feature distance represents a degree of similarity between one object in the first image and one object in the second image; determine second feature distances based on the surrounding information of the objects in the first image and the surrounding information of the objects in the second image, where a second feature distance represents a degree of similarity between the surrounding information of one object in the first image and the surrounding information of one object in the second image; for one object in the first image and one object in the second image, determine, according to the first feature distance and the second feature distance of the two objects, a feature distance between the two objects; and determine the association relationship between the objects in the first image and the objects in the second image based on the determined feature distance.

In some optional embodiments of the present disclosure, the processor is configured to perform weighted summation on the first feature distance and the second feature distance of the two objects to obtain the feature distance between the two objects, where the higher the degree of similarity between the two objects, the greater a weight coefficient of the second feature distance of the two objects during weighted summation.

In some optional embodiments of the present disclosure, the processor is further configured to: determine geometric distances between the objects in the first image and the objects in the second image; and for one object in the first image and one object in the second image, determine, according to the feature distance and the geometric distance between the two objects, a distance between the two objects;

and determine an association relationship between the objects in the first image and the objects in the second image according to the distances between the objects in the first image and the objects in the second image.

In some optional embodiments of the present disclosure, the processor is configured to: obtain a first position of a first image acquisition device which acquires the first image, and a second of where a second image acquisition device which acquires the second image, and obtain a first intrinsic parameter of the first image acquisition device and a second intrinsic parameter of the second image acquisition device; determine a third position of a center point of one object in the first image in the first image; determine a polar line in the second image based on the first position, the second position, the third position, the first intrinsic parameter, and the second intrinsic parameter, where the polar line represents a straight line formed by projecting a connection line between a center point of one object in the first image and an image point of the object in an imaging plane of the first image acquisition device to the second image; determine the vertical pixel distance between one object in the second image and the polar line; and determine the geometric distances between the objects in the first image and the objects in the second image according to the determined vertical pixel distance.

In some optional embodiments of the present disclosure, the processor is configured to perform weighted summation on the feature distance and the geometric distance between the two objects to obtain the distance between the two objects.

In some optional embodiments of the present disclosure, the processor is configured to: form a distance matrix based on the distances between the objects in the first image and the objects in the second image, where a value of one element in the distance matrix represents a distance between one object in the first image and one object in the second image; and determine an adjacency matrix between the first image and the second image according to the distance matrix, where a value of an element in the adjacency matrix represents that one object in the first image is associated with or unassociated with one object in the second image.

The computer readable storage medium provided by the embodiments of the present disclosure has a computer program stored thereon, where when the program is executed by a processor, the steps of the image processing method according to the foregoing embodiments of the present disclosure are implemented.

The methods disclosed in the method embodiments provided by the present disclosure can be arbitrarily combined without causing conflicts so as to obtain a new method embodiment.

The features disclosed in several product embodiments provided by the present disclosure can be arbitrarily combined without causing conflicts so as to obtain a new product embodiment.

The features disclosed in several method or device embodiments provided by the present disclosure can be arbitrarily combined without causing conflicts so as to obtain a new method or device embodiment.

It should be understood that the disclosed device and method in several embodiments provided in the present disclosure may be implemented in other manners. The device embodiments described above are merely exemplary. For example, the unit division is merely logical function division and may be actually implemented in other division manners. For example, a plurality of units or components may be combined or integrated into another system, or some features may be ignored or not performed. In addition, the displayed or discussed mutual couplings or direct couplings or communication connections among the components may be implemented by means of some ports. The indirect couplings or communication connections between the devices or units may be electrical, mechanical, or in other forms.

The units described as separate components may or may not be physically separate, and the components displayed as units may or may not be physical units, i.e., may be located at one position, or may be distributed on a plurality of network units. Some or all of the units may be selected according to actual needs to achieve the objectives of the solutions of the embodiments.

In addition, the functional units in the embodiments of the present disclosure may be integrated into one processing unit, or each of the units may exist as one independent unit, or two or more units are integrated into one unit, and the integrated unit may be implemented in the form of hardware, or may be implemented in the form of hardware and software functional units.

A person of ordinary skill in the art may understand that all or some steps for implementing the foregoing method embodiments may be achieved by a program by instructing related hardware; the foregoing program can be stored in a computer readable storage medium; when the program is executed, the steps in the foregoing method embodiments are performed. Moreover, the foregoing storage medium includes various media capable of storing a program code, such as a mobile storage device, a ROM, a RAM, a magnetic disk, or an optical disk.

Alternatively, when the foregoing integrated unit of the present disclosure is implemented in the form of a software functional module and sold or used as an independent product, the integrated unit may be stored in one computer readable storage medium. Based on such an understanding, the technical solutions in the embodiments of the present disclosure or some contributing to the prior art may be essentially embodied in the form of software products. The computer software product is stored in one storage medium and includes several instructions so that one computer device (which may be a personal computer, a server, a network device, and the like) implements all or a part of the method in the embodiments of the present disclosure. Moreover, the storage medium above includes various media capable of storing a program code, such as a mobile storage device, a ROM, a RAM, a magnetic disk, or an optical disk.

The descriptions above are only specific implementations of the present disclosure. However, the scope of protection of the present disclosure is not limited thereto. Within the technical scope disclosed by the present disclosure, any variation or substitution that can be easily conceived of by those skilled in the art should all fall within the scope of protection of the present disclosure. Therefore, the scope of protection of the present disclosure should be determined by the scope of protection of the appended claims.

The invention claimed is:

1. An object association method, comprising:
obtaining a first image and a second image; and
determining a plurality of first feature distances based on appearance information of a plurality of objects in the first image and appearance information of a plurality of objects in the second image, wherein a first feature distance represents a degree of similarity between one object of the plurality of objects in the first image and one object of the plurality of objects in the second image, and appearance information of one object is determined according to pixels within a bounding box of the object in an image where the object is located;

determining a plurality of second feature distances based on surrounding information of the plurality of objects in the first image and surrounding information of the plurality of objects in the second image, wherein a second feature distance represents a degree of similarity between surrounding information of one object of the plurality of objects in the first image and surrounding information of one object of the plurality of objects in the second image, and surrounding information of one object is determined according to pixels within a set range around a bounding box of the object in an image where the object is located;

for one object in the first image and one object in the second image, performing weighted summation on a first feature distance and a second feature distance between the object in the first image and the object in the second image to obtain a feature distance between the object in the first image and the object in the second image, wherein a plurality of weight coefficients are pre-configured, and a weight coefficient is selected from the plurality of weight coefficients according to the first feature distance between the object in the first image and the object in the second image as a weight coefficient of the second feature distance, and in condition that the first feature distance between the object in the first image and the object in the second image is smaller, the weight coefficient of the second feature distance between the object in the first image and the object in the second image is larger during weighted summation; and determining an association relationship between the plurality of objects in the first image and the plurality of objects in the second image based on a plurality of determined feature distances.

2. The method according to claim 1, wherein the method further comprises:

determining a plurality of geometric distances between the plurality of objects in the first image and the plurality of objects in the second image; and determining the association relationship between the plurality of objects in the first image and the plurality of objects in the second image based on the plurality of determined feature distances comprises:

for one object in the first image and one object in the second image, determining, according to a feature distance and a geometric distance between the object in the first image and the object in the second image, a distance between the object in the first image and the object in the second image; and determining the association relationship between the plurality of objects in the first image and the plurality of objects in the second image according to a plurality of distances between the plurality of objects in the first image and the plurality of objects in the second image.

3. The method according to claim 2, wherein determining the plurality of geometric distances between the plurality of objects in the first image and the plurality of objects in the second image comprises:

obtaining a first position of a first image acquisition device which acquires the first image, and a second position of a second image acquisition device which acquires the second image, and obtaining a first intrinsic parameter of the first image acquisition device and a second intrinsic parameter of the second image acquisition device;

determining a third position of a center point of one object in the first image;

determining a polar line in the second image based on the first position, the second position, the third position, the first intrinsic parameter, and the second intrinsic parameter, wherein the polar line represents a straight line formed by projecting a connection line between a center point of one object in the first image and an image point of the object in an imaging plane of the first image acquisition device to the second image;

determining a vertical pixel distance between one object in the second image and the polar line; and determining the plurality of geometric distances between the plurality of objects in the first image and the plurality of objects in the second image according to a plurality of determined vertical pixel distances.

4. The method according to claim 2, wherein determining, according to the feature distance and the geometric distance between the object in the first image and the object in the second image, the distance between the object in the first image and the object in the second image comprises:

performing weighted summation on the feature distance and the geometric distance between the object in the first image and the object in the second image to obtain the distance between the object in the first image and the object in the second image.

5. The method according to claim 2, wherein determining the association relationship between the plurality of objects in the first image and the plurality of objects in the second image according to the plurality of distances between the plurality of objects in the first image and the plurality of objects in the second image comprises:

forming a distance matrix based on the plurality of distances between the plurality of objects in the first image and the plurality of objects in the second image, wherein a value of one element in the distance matrix represents a distance between one object in the first image and one object in the second image; and determining an adjacency matrix between the first image and the second image according to the distance matrix, wherein a value of an element in the adjacency matrix represents that one object in the first image is associated with or unassociated with one object in the second image.

6. An object association system, comprising:

a first image acquisition device, configured to acquire one scene at a first view to obtain the first image;

a second image acquisition device, configured to acquire the scene at a second view to obtain the second image, wherein the first view is different from the second view; and a processor, configured to perform the object association method according to claim 1.

7. The method according to claim 1, wherein determining the association relationship between the plurality of objects in the first image and the plurality of objects in the second image based on the plurality of determined feature distances comprises:

when the determined feature distance is greater than a first preset threshold, determining that the object in the first image is unassociated with the object in the second image; and when the determined feature distance is less than a second preset threshold, determining that the object in the first image is associated with the object in the second image, wherein the second preset threshold is less than the first preset threshold.

8. An object association apparatus, comprising: a processor; and a memory configured to store computer instructions executable by the processor,
wherein the processor is configured to:
obtain a first image and a second image;
determine a plurality of first feature distances based on appearance information of a plurality of objects in the first image and appearance information of a plurality of objects in the second image, wherein a first feature distance represents a degree of similarity between one object of the plurality of objects in the first image and one object of the plurality of objects in the second image, and appearance information of one object is determined according to pixels within a bounding box of the object in an image where the object is located;
determine a plurality of second feature distances based on surrounding information of the plurality of objects in the first image and surrounding information of the plurality of objects in the second image, wherein a second feature distance represents a degree of similarity between surrounding information of one object of the plurality of objects in the first image and surrounding information of one object of the plurality of objects in the second image, and surrounding information of one object is determined according to pixels within a set range around a bounding box of the object in an image where the object is located;
for one object in the first image and one object in the second image, perform weighted summation on a first feature distance and a second feature distance between the object in the first image and the object in the second image to obtain a feature distance between the object in the first image and the object in the second image, wherein a plurality of weight coefficients are pre-configured, and a weight coefficient is selected from the plurality of weight coefficients according to the first feature distance between the object in the first image and the object in the second image as a weight coefficient of the second feature distance, and in condition that the first feature distance between the object in the first image and the object in the second image is smaller, the weight coefficient of the second feature distance between the object in the first image and the object in the second image is larger during weighted summation; and
determine an association relationship between the plurality of objects in the first image and the plurality of objects in the second image based on a plurality of determined feature distances.

9. The apparatus according to claim 8, wherein the processor is further configured to:
determine a plurality of geometric distances between the plurality of objects in the first image and the plurality of objects in the second image, and for one object in the first image and one object in the second image, determine, according to a feature distance and a geometric distance between the object in the first image and the object in the second image, a distance between the object in the first image and the object in the second image; and
determine the association relationship between the plurality of objects in the first image and the plurality of objects in the second image according to a plurality of distances between the plurality of objects in the first image and the plurality of objects in the second image.

10. The apparatus according to claim 9, wherein the processor is configured to:
obtain a first position of a first image acquisition device which acquires the first image, and a second position of a second image acquisition device which acquires the second image, and obtain a first intrinsic parameter of the first image acquisition device and a second intrinsic parameter of the second image acquisition device;
determine a third position of a center point of one object in the first image;
determine a polar line in the second image based on the first position, the second position, the third position, the first intrinsic parameter, and the second intrinsic parameter, wherein the polar line represents a straight line formed by projecting a connection line between a center point of one object in the first image and an image point of the object in an imaging plane of the first image acquisition device to the second image;
determine a vertical pixel distance between one object in the second image and the polar line; and
determine the plurality of geometric distances between the plurality of objects in the first image and the plurality of objects in the second image according to a plurality of determined vertical pixel distances.

11. The apparatus according to claim 9, wherein the processor is configured to perform weighted summation on the feature distance and the geometric distance between the object in the first image and the object in the second image to obtain the distance between the object in the first image and the object in the second image.

12. The apparatus according to claim 9, wherein the processor is configured to:
form a distance matrix based on the plurality of distances between the plurality of objects in the first image and the plurality of objects in the second image, wherein a value of one element in the distance matrix represents a distance between one object in the first image and one object in the second image; and
determine an adjacency matrix between the first image and the second image according to the distance matrix, wherein a value of an element in the adjacency matrix represents that one object in the first image is associated with or unassociated with one object in the second image.

13. The apparatus according to claim 8, wherein the processor is further configured to:
when the determined feature distance is greater than a first preset threshold, determine that the object in the first image is unassociated with the object in the second image; and
when the determined feature distance is less than a second preset threshold, determine that the object in the first image is associated with the object in the second image, wherein the second preset threshold is less than the first preset threshold.

14. A non-transitory computer readable storage medium, having a computer program stored thereon, wherein the computer program, when being executed by a processor, enables the processor to implement the operations of:
obtaining a first image and a second image;
determining a plurality of first feature distances based on appearance information of a plurality of objects in the first image and appearance information of a plurality of objects in the second image, wherein a first feature distance represents a degree of similarity between one object of the plurality of objects in the first image and one object of the plurality of objects in the second image, and appearance information of one object is determined according to pixels within a bounding box of the object in an image where the object is located;

determining a plurality of second feature distances based on surrounding information of the plurality of objects in the first image and surrounding information of the plurality of objects in the second image, wherein a second feature distance represents a degree of similarity between surrounding information of one object of the plurality of objects in the first image and surrounding information of one object of the plurality of objects in the second image, and surrounding information of one object is determined according to pixels within a set range around a bounding box of the object in an image where the object is located;

for one object in the first image and one object in the second image, performing weighted summation on a first feature distance and a second feature distance between the object in the first image and the object in the second image to obtain a feature distance between the object in the first image and the object in the second image, wherein a plurality of weight coefficients are pre-configured, and a weight coefficient is selected from the plurality of weight coefficients according to the first feature distance between the object in the first image and the object in the second image as a weight coefficient of the second feature distance, and in condition that the first feature distance between the object in the first image and the object in the second image is smaller, the weight coefficient of the second feature distance between the object in the first image and the object in the second image is larger during weighted summation; and determining an association relationship between the plurality of objects in the first image and the plurality of objects in the second image based on a plurality of determined feature distances.

15. The non-transitory computer readable storage medium according to claim 14, wherein the computer program, when being executed by the processor, enables the processor to further implement the operations of:

when the determined feature distance is greater than a first preset threshold, determining that the object in the first image is unassociated with the object in the second image; and when the determined feature distance is less than a second preset threshold, determining that the object in the first image is associated with the object in the second image, wherein the second preset threshold is less than the first preset threshold.

* * * * *